(12) United States Patent
Atluru et al.

(10) Patent No.: US 11,303,966 B2
(45) Date of Patent: Apr. 12, 2022

(54) CONTENT BASED STREAM SPLITTING OF VIDEO DATA

(71) Applicant: Dolby Laboratories Licensing Corporation, San Francisco, CA (US)

(72) Inventors: Chaitanya Atluru, San Jose, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 467 days.

(21) Appl. No.: 16/336,628

(22) PCT Filed: Sep. 18, 2017

(86) PCT No.: PCT/US2017/052110
§ 371 (c)(1),
(2) Date: Mar. 26, 2019

(87) PCT Pub. No.: WO2018/057472
PCT Pub. Date: Mar. 29, 2018

(65) Prior Publication Data
US 2021/0314670 A1    Oct. 7, 2021

Related U.S. Application Data

(60) Provisional application No. 62/399,574, filed on Sep. 26, 2016.

(30) Foreign Application Priority Data

Sep. 26, 2016 (EP) .................................. 16190623

(51) Int. Cl.
*H04N 21/4728*    (2011.01)
*H04N 21/84*    (2011.01)
(Continued)

(52) U.S. Cl.
CPC ....... *H04N 21/4728* (2013.01); *H04N 13/117* (2018.05); *H04N 21/21805* (2013.01);
(Continued)

(58) Field of Classification Search
None
See application file for complete search history.

(56) References Cited

U.S. PATENT DOCUMENTS

| 5,703,604 A | 12/1997 | McCutchen |
| 8,228,364 B2 | 7/2012 | Cilia |

(Continued)

FOREIGN PATENT DOCUMENTS

| CN | 1643875 | 7/2005 |
| CN | 1860791 | 11/2006 |

(Continued)

OTHER PUBLICATIONS

Mavlankar, Aditya et al., "An interactive region-of-interest video streaming system for online lecture viewing", 18th International Packet Video Workshop, IEEE conferences, Year: 2010, Papers (16) | Patents (8), pp. 64-71.

*Primary Examiner* — Alazar Tilahun

(57) ABSTRACT

Scenes in video images are identified based on image content of the video images. Regional cross sections of the video images are determined based on the scenes in the video images. Image portions of the video images in the regional cross sections are encoded into multiple video sub-streams at multiple different spatiotemporal resolutions. An overall video stream that includes the multiple video sub-streams is transmitted to a streaming client device.

14 Claims, 12 Drawing Sheets

(51) Int. Cl.
*H04N 13/117* (2018.01)
*H04N 21/4402* (2011.01)
*H04N 21/431* (2011.01)
*H04N 21/218* (2011.01)

(52) U.S. Cl.
CPC . *H04N 21/4312* (2013.01); *H04N 21/440272* (2013.01); *H04N 21/84* (2013.01)

(56) References Cited

U.S. PATENT DOCUMENTS

| | | | |
|---|---|---|---|
| 8,264,524 | B1 | 9/2012 | Davey |
| 8,633,984 | B2 | 1/2014 | Drive |
| 8,848,053 | B2 | 9/2014 | Scanlon |
| 8,885,882 | B1 * | 11/2014 | Yin .................. G06K 9/00248 382/103 |
| 9,215,467 | B2 | 12/2015 | Cheok |
| 2002/0021353 | A1 | 2/2002 | Denies |
| 2005/0094732 | A1 | 5/2005 | Mukherjee |
| 2008/0036875 | A1 | 2/2008 | Jones |
| 2010/0050221 | A1 | 2/2010 | McCutchen |
| 2014/0199050 | A1 | 7/2014 | Khalsa |
| 2015/0373341 | A1 | 12/2015 | Davies |
| 2016/0029091 | A1 * | 1/2016 | Le Floch ....... H04N 21/234345 375/240.26 |
| 2016/0088280 | A1 | 3/2016 | Sadi |
| 2016/0260196 | A1 * | 9/2016 | Roimela ................. G06T 11/60 |

FOREIGN PATENT DOCUMENTS

| | | |
|---|---|---|
| CN | 101115200 | 1/2008 |
| CN | 102812718 | 12/2012 |
| EP | 2490179 | 8/2012 |
| EP | 2874396 | 5/2015 |
| EP | 3065406 | 9/2016 |
| JP | 2005130251 | 5/2005 |
| JP | 2009027564 | 2/2009 |
| JP | 2009188792 | 8/2009 |
| JP | 2016019248 | 2/2016 |
| JP | 2016165105 | 9/2016 |
| KR | 20130127472 | 11/2013 |
| KR | 20150096474 | 8/2015 |
| WO | 2014/191990 | 12/2014 |
| WO | 2015/014773 | 2/2015 |
| WO | 2015/197815 | 12/2015 |
| WO | 2016010668 | 1/2016 |

* cited by examiner

US 11,303,966 B2

CONTENT BASED STREAM SPLITTING OF VIDEO DATA

TECHNOLOGY

The present invention relates generally to image coding and rendering, and in particular, to content based stream splitting of video data.

BACKGROUND

For virtual reality applications such as those with near-eye displays, the amount of desired video data may be equivalent to eighteen 4K resolution views in order to have a seamless experience in viewing images at a spatial resolution that prevents the human vision from perceiving pixilation effects in all potential viewing angles at all time. This amount of desired video data is enormous and is currently impractical to be supported by a wide variety of display devices such as near-eye displays in current network infrastructures, given the amount of bandwidth and computing power required to compress and decompress the video data.

Some techniques address this issue by partitioning the sphere into a number of "pyramid faces" of a pyramid. A base pyramid face covers the immediate surrounding of a field of view (FOV) and carries high resolution images. Other non-base pyramid faces carry low resolution images. However, these techniques suffer from a noticeable lag (e.g., longer than 12-15 milliseconds, etc.) in seeing high resolution images with a user's each change of FOV into a non-base pyramid face. Furthermore, since the pyramid is partitioned based on area/volume, a user's FOV may intersect two pyramid faces, leaving a portion of the FOV at the low resolution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
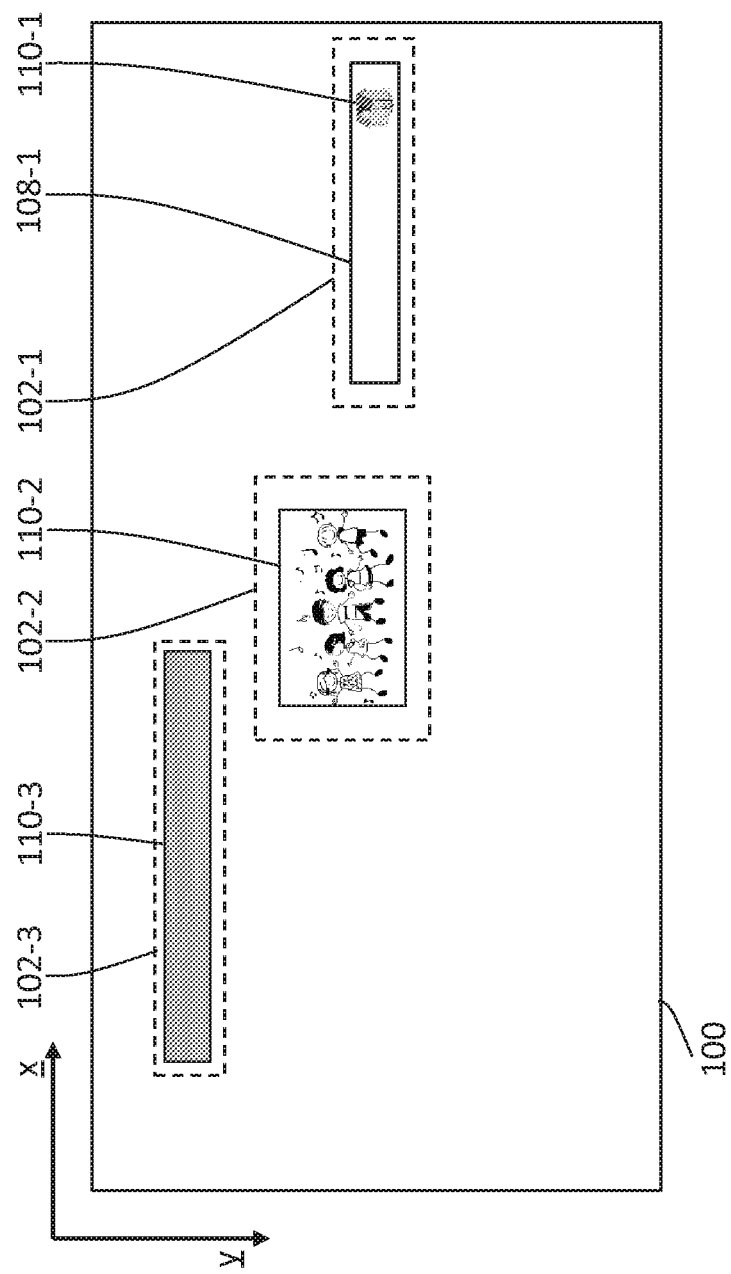
FIG. 1 illustrates an example video image.

Example embodiments, which relate to content based stream splitting of video data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. VIDEO IMAGES
3. REGIONAL CROSS SECTIONS AND SCENES OF INTEREST
4. DETECTING SCENES FROM VIDEO IMAGES
5. EXAMPLE SCENES, REGIONAL CROSS SECTIONS AND VIDEO SUB-STREAMS
6. EXAMPLE VIDEO STREAMING SERVERS AND CLIENTS
7. EXAMPLE PROCESS FLOWS
8. IMPLEMENTATION MECHANISMS—HARDWARE OVERVIEW
9. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used to minimize bandwidth usage for streaming video data between video streaming server(s) and video streaming client(s). Example video content may include, but are not necessarily limited to, any of: audiovisual programs, movies, video programs, TV broadcasts, computer games, augmented reality (AR) content, virtual reality (VR) content, etc. Example video streaming clients may include, but are not necessarily limited to, any of: display devices, a computing device with a near-eye display, a head-mounted display (HMD), a mobile device, a wearable display device, a set-top box with a display such as television, a video monitor, etc.

As used herein, a "video streaming server" may refer to one or more devices that prepare and stream video content to one or more video streaming clients in order to render at least a portion (e.g., corresponding to a user's FOV or viewport, etc.) of the video content on one or more displays. The displays on which the video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, digital media devices, digital media receivers, set-top boxes, gaming machines (e.g., an Xbox), general purpose personal computers, tablets, dedicated digital media receivers such as the Apple TV or the Roku box, etc.

Under techniques as described herein, the entire area of one or more video images can be partitioned into multiple regional cross sections based on one or more of: a user's viewport, a user's foveal vision, scenes of high interest, scenes of low interest, etc. Each of the regional cross sections may represent only a proper subset of the entire area of the video images, for example, up to a view of 180 degrees times 100 degrees, up to a view of 240 degrees times 90 degrees, comparable to a field of view in the human vision, etc. However, the combination of all possible regional cross sections may cover the entire area of the video images.

A video streaming server can transmit respective image portions in the multiple regional cross sections of the video images in multiple video sub-streams at different spatiotemporal resolutions to downstream recipient devices, instead of encoding and transmitting video images in their entire spatial areas at fixed high spatiotemporal resolutions using an extremely large bandwidth budget (e.g., equivalent to 18 4K video streams, etc.). As used herein, spatiotemporal resolution may refer to spatial resolutions only (including but not limited to high spatial frequency content), temporal resolutions only (including but not limited to image refresh rates), or a combination of spatial resolutions and temporal resolutions. Accordingly, the techniques as described herein can be used to reduce or minimize the amount of video data to be streamed between a video streaming server and a video streaming client (e.g., a client device that consumes and/or plays the streamed video data, etc.), thereby reducing or minimizing the need for using a relatively large bandwidth budget to stream video data and efficiently supporting a wide variety of video streaming applications to a wide variety of downstream devices.

At the same time, the techniques as described herein can be used to allow a user of a downstream recipient device to freely vary the user's viewing angles or fields of view to the video images. In most if not all operating scenarios, the user can be presented with high-resolution video content for a seamless viewing experience that is relatively free from visual artifacts, physiological discomforts, etc., associated with some other approaches that do not adopt the techniques as described herein. The visual artifacts, physiological discomforts, etc., associated with the other approaches may include, but are not necessarily limited to, any of: prolonged lags in transitioning to high resolution imagery as perceived by the human vision, low resolution imagery noticeable within a central viewing area of the human vision, mismatches between a user's natural vision-related intuition and video content as actually rendered to the user, sudden drop of visual clarity in imagery when a viewer moves viewing angles, perceptible slow transitioning from low resolutions to high resolutions, showing fuzzy images for previously occluded image details when a viewer moves viewing angles, etc.

Example embodiments described herein relate to streaming video data. A plurality of scenes in the one or more video images is identified based on image content of one or more video images. A plurality of regional cross sections of the one or more video images is determined based on the plurality of scenes in the one or more video images. A plurality of image portions of the one or more video images in the plurality of regional cross sections is encoded into two or more video sub-streams at two or more different spatiotemporal resolutions. An overall video stream that includes the two or more video sub-streams is transmitted to a streaming client device.

Example embodiments described herein relate to presenting streamed video data to viewers. An overall video stream that includes two or more video sub-streams at two or more different spatiotemporal resolutions is received from a streaming server. The two or more video sub-streams are decoded into one or more image portions of one or more video images. The one or more image portions are in one or more regional cross sections in a plurality of regional cross sections. The plurality of regional cross sections is determined based at least in part on a plurality of scenes. The plurality of scenes is detected based on image content of the one or more video images. Video content is generated based on the one or more image portions of the one or more video images. The video content is caused to be rendered in a display.

In some example embodiments, mechanisms as described herein form a part of a media processing system, including but not limited to any of: cloud-based server, mobile device, virtual reality system, augmented reality system, head up display device, helmet mounted display device, CAVE-type system or wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. VIDEO IMAGES

In some embodiments, video images as described herein can be captured with one or more camera systems deployed in one or more spatial environments. Example spatial environments may include, but are not limited to only, any of: physical spatial environment, simulated spatial environment, movie studios, outdoor scenes, indoor scenes, tunnels, streets, vehicles, ships, aircrafts, outer space, etc. Example camera systems may include, but are not limited to only, any of: light field cameras, multiple cameras with overlapping and/or non-overlapping fields of vision, digital cameras, analog cameras, webcams, etc.

A video image as described herein may be recorded or assembled as pixel values distributed in an image (e.g., rectangular image, spherical image, etc.) of various spatial shapes. Example spatial shapes may include, but are not necessarily limited to only, any of: rectangular shapes, spherical shapes, panoramic shapes, regular shapes, irregular shapes, planar shapes, curved surface shapes, etc.

FIG. 1 illustrates an example video image 100. In some embodiments, the regional image (100) may represent one individual high-resolution regional image in a sequence of (e.g., high-resolution, etc.) video images. A video streaming server may be configured to receive and use the received sequence of video images as input to prepare video content for streaming to (downstream) video streaming clients in support of one or more of: VR applications, AR applications, remote presence applications, display applications, etc.

A video image as described herein can be represented in any of a wide variety of coordinate systems such as a World coordinate system, a coordinate system stationary to a camera system, a coordinate system fixed relative to a spatial environment, etc. A spatial position in the video image (100) may be either an absolute position (e.g., represented in the World coordinate system, etc.) or a relative position (e.g., represented in a relative coordinate system stationary to the camera system, etc.).

In some embodiments, a spatial position (e.g., a pixel, etc.) in the video image (100) can be represented by a set of specific (x, y) coordinate values.

3. REGIONAL CROSS SECTIONS AND SCENES OF INTEREST

As used herein, a regional cross section in the video image (100) may refer to a spatial area portion or a spatial volume portion, and may be formed by a collection of (e.g., contiguous, disjoint, etc.) spatial positions in the video image (100). A specific regional cross section in the video image (100) may be represented by one or more of: an area portion, a spatial shape, a spatial region, etc., on the video image (100).

A scene as described herein may refer to a specific image portion of video image(s) that occupies a specific regional cross section of the entire area of the video image(s). The video image(s) may contain multiple scenes that occupy different video cross sections of the entire area of the video image(s). Each scene may be classified into a scene of high interest (e.g., 110-2, etc.), a scene of low interest (e.g., 110-1, 110-3, etc.), etc., based on a specific user interest level as determined for the specific image portion of the video image(s) in the scene.

In some embodiments, all the regional cross sections (e.g., 102-1, 102-2, 102-3, etc.) of the video image (100), as partitioned from the entire spatial area (or volume) represented in the video image (100), are classified based on one or more regional cross section types. Image portions in the regional cross sections in the video image (100) may be encoded in multiple video sub-streams at different spatiotemporal resolutions that are dependent on the regional cross section types. For example, images portions of regional cross sections of specific regional cross section types indicating that the regional cross sections are in a user's (or viewer's) viewport, in the user's (or viewer's) foveal vision, in the scenes of high interest outside the user's (or viewer's) viewport or foveal vision, etc., may be encoded with relatively high spatiotemporal resolutions. Images portions of specific regional cross section types indicating that the regional cross sections are not in a user's (or viewer's) viewport, in the user's (or viewer's) foveal vision, in the scenes of high interest outside the user's (or viewer's) viewport or foveal vision, etc., may be encoded with relatively low spatiotemporal resolutions.

Figure 2A:
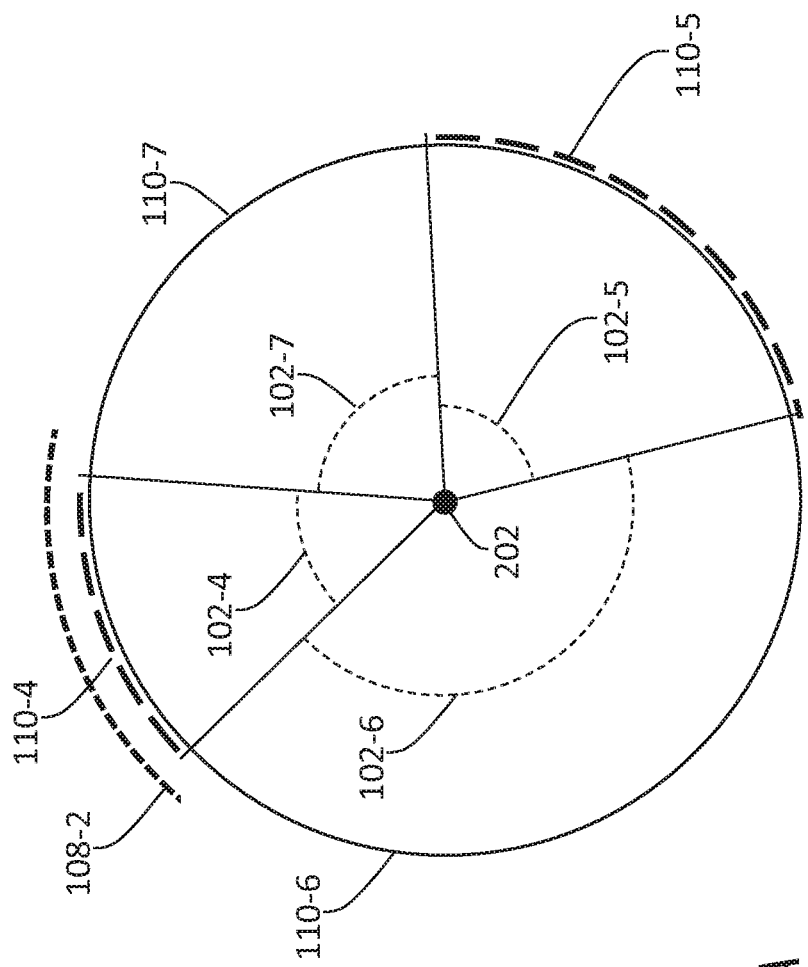
FIG. 2A through FIG. 2C illustrate example regional cross sections of video image(s) that are being viewed by a user.

By way of example but not limitation, the regional cross sections (e.g., 102-1, 102-2, 102-3, etc.) of the regional image (100) include first regional cross section(s) (e.g., 102-1, etc.) of the video image (100) that at least cover a user's (signaled) viewport (e.g., 108-1, 108-2 of FIG. 2A, etc.).

The user's viewport may refer to the user's field of view as provided on a display through which the user views an image portion of the video image (100). The user's viewport at runtime may be tracked by a face tracking device and/or an eye tracking device. The face/eye tracking device(s) may operate in real time with a display on which the image portion of the video image (100) is rendered. As the user changes viewing angles and/or viewing distances from time to time, the face/eye tracking device(s) tracks and computes the viewing angles and/or viewing distances in a coordinate system in which the sequence of video images is represented, generates a time sequence of viewports (or a time sequence of fields of view), and signals each viewport (e.g., 108-1, 108-2 of FIG. 2A, etc.) in the time sequence of viewports to a video streaming server as described herein. Each such signaled viewport of the user as received by the video streaming server may be indexed by a time point value or a viewport index value that corresponds to a time point value. The time point value may be associated or correlated by a video streaming server as described herein with a specific video image in the sequence of video images.

The first regional cross section(s) (e.g., 102-1, etc.) that cover the user's viewport (e.g., 108-1, 108-2 of FIG. 2A, etc.) may be classified as viewport types among available regional cross section types to classify regional cross sections.

In some embodiments, the first regional cross section(s) (e.g., 102-1, etc.) may be further partitioned into one or more first regional cross sections that cover the user's foveal vision and one or more other first regional cross sections that do not cover the user's foveal vision. The one or more first regional cross sections may be additionally, optionally, or alternatively, classified as foveal-vision types among the available regional cross section types to classify regional cross sections. The one or more other first regional cross sections may be additionally, optionally, or alternatively, classified as non-foveal-vision types among the available regional cross section types to classify regional cross sections.

In addition to the regional cross sections in the user's viewport, the regional cross sections (e.g., 102-1, 102-2, 102-3, etc.) of the video image (100) may also include second regional cross section(s) (e.g., 102-2, 102-3, etc.) of the video image (100) that do not cover the viewport (e.g., 108-1, 108-2 of FIG. 2A, etc.) of the user. The second regional cross sections (e.g., 102-2, 102-3, etc.) may be classified as non-viewport types among the available regional cross section types to classify regional cross sections.

In an example embodiment, regional cross section types may be used to correspond to, or indicate presences of, one or more scenes of various user interest levels. A regional cross section (e.g., 102-2, etc.) may correspond to, or indicate that the regional cross section is at least partially overlaps with, a scene of high interest (e.g., 110-2, etc.). Another regional cross section (e.g., 102-3, etc.) may correspond to, or indicate that the regional cross section is completely occupied by, scenes of low interest (e.g., 110-3, etc.).

In some embodiments, shapes, sizes, aspect ratios, spatial locations, etc., of regional cross sections (e.g., 102-1, 102-2, 102-3, etc.) in video image(s) (e.g., 100, etc.) are not statically fixed a priori without consideration of actual image content in the video image(s), but rather are determined or computed (e.g., through pre-processing of actual image content, at runtime, dynamically, etc.) based on the user's viewport, the user's foveal vision, the scenes detected in the video image(s), shapes, sizes, aspect ratios, spatial locations, etc., of image details that constitute the scenes, etc.

For example, the first regional cross section(s) (e.g., 102-1, etc.) in the video image (100) can be generated or identified based on the user's viewport (e.g., 108-1, etc.), the user's foveal vision, scenes of high interest overlapping with the user's viewport (e.g., 108-1, etc.) or foveal vision, etc. Shapes, sizes, aspect ratios, spatial locations, etc., of the first regional cross section(s) (e.g., 102-1, etc.) in the video image (100) can be determined or selected (e.g., through pre-processing of actual image content, at runtime, dynamically, etc.) based on shapes, sizes, aspect ratios, spatial locations, etc., of the user's viewport (e.g., 108-1, etc.), the user's foveal vision, scenes of high interest overlapping with the user's viewport (e.g., 108-1, etc.) or foveal vision, etc.

It should be noted, however, that the shapes, sizes, aspect ratios, spatial locations, etc., of the first regional cross section(s) (e.g., 102-1, etc.) need not to be identical to, or in exact delineation with, shapes, sizes, aspect ratios, spatial locations, etc., of the user's viewport (e.g., 108-1, etc.), the user's foveal vision, scenes of high interest (e.g., 110-1, etc.) overlapping with the user's viewport (e.g., 108-1, etc.) or foveal vision, etc.

In some embodiments, if it is determined that the user's viewport spatially includes/covers a complete scene of high interest, then the first regional cross section(s) (e.g., 102-1, etc.) may be generated or identified to consist of a regional cross section of a spatial shape that is approximate to and encompassing the spatial shape of the viewport (e.g., 108-1, etc.). However, if it is determined that the scene of high interest spatially includes/covers the user's complete viewport), then the first regional cross section(s) (e.g., 102-1, etc.) may be generated or identified to consist of a spatial shape that is approximate to and encompassing the scene of high interest. Further, if it is determined that the scene of high interest partially but not completely overlaps spatially with the user's complete viewport, then the first regional cross section(s) (e.g., 102-1, etc.) may be generated or identified to consist of a regional cross section of a spatial shape that is approximate to and encompassing a (spatial) union of the scene of high interest and the user's complete viewport.

Image portions in the user's viewport or the user's foveal vision such as some or all of the first regional cross section(s) of the video image (100) may be encoded in a single video sub-stream at high spatiotemporal resolutions and provided to downstream recipient devices. As a result, when the user moves viewing angles within the scene of high interest, the single video sub-stream encoded with the image portion(s) in the first regional cross section(s) (e.g., 102-1, etc.) are sufficient to provide a seamless viewing experience of the scene of high interest.

In some embodiments, the second regional cross sections (e.g., 102-2, 102-3, etc.) can be generated or identified based on scenes (e.g., 110-2, 110-3, etc.) in the video image (100) that are not in the user's viewport. Shapes, sizes, aspect ratios, spatial locations, etc., of the second regional cross sections (e.g., 102-2, 102-3, etc.) in the video image (100) can be determined or selected (e.g., through pre-processing of actual image content, at runtime, dynamically, etc.) based on shapes, sizes, aspect ratios, spatial locations, etc., of the scenes (e.g., 110-2, 110-3, etc.) in the video image (100) that are not in the user's viewport.

It should be noted, however, that the shapes, sizes, aspect ratios, spatial locations, etc., of the second regional cross sections (e.g., 102-2, 102-3, etc.) need not to be identical to, or in exact delineation with, shapes, sizes, aspect ratios, spatial locations, etc., of the scenes (e.g., 110-2, 110-3, etc.) in the video image (100) that are not in the user's viewport.

4. DETECTING SCENES FROM VIDEO IMAGES

Scenes of various user interest levels such as scenes of high interest (e.g., 110-2, etc.), scenes of low interest (e.g., 110-2, 110-3, etc.), etc., in the video image (100) may be determined for video image(s) (e.g., 100, etc.) before and/or while encoding image portions of regional cross sections in the video image(s).

In some embodiments, scenes of various user interest levels in video image(s) (e.g., 100, etc.) may be generated or identified based at least in part on user input from a video professional such as a director, a colorist, a video engineer, a content creation artist, etc. The video professional may identify/recognize scenes in the video image(s), and classify the scenes into scenes of high interest (e.g., 110-2, etc.), scenes of low interest (e.g., 110-1, 110-3, etc.), etc. For example, the video professional can provide user input specifying a scene of high interest (e.g., 110-2, etc.) that focuses on a particular person depicted in the video image(s) (e.g., 100, etc.). The video professional can also provide user input specifying a scene of high interest (e.g., 110-2, etc.) that focuses on a particular object such as a stage, a football, etc., depicted in the video image(s) (e.g., 100, etc.). The video professional may provide the user input while previewing the video image(s) (e.g., 100, etc.) or while monitoring the video image(s) (e.g., 100, etc.) generated live from a concert, a game, a speech, etc.

In some embodiments, scenes of various user interest levels in video image(s) (e.g., 100, etc.) may be generated or identified based at least in part on image content analyses on the video image(s) (e.g., 100, etc.). In some embodiments, some or all of the entire area of the video image (e.g., 100, etc.), as distributed over 360 degrees times 180 angular degrees of an equirectangular image representation, may be analyzed, assessed, etc., to determine or identify the scenes of high interest (e.g., 110-2, etc.), the scenes of low interest (e.g., 110-1, 110-3, etc.), etc., in the video image (100). Image content analyses as described herein may be performed using one or more of: analysis rules, image analysis tools, any combination of one or more computer vision techniques such as Haar Filters, wavelet decomposition, Fourier space based spatial resolution tracking, etc.

For example, visual objects, visual elements, etc., in the video image(s) (e.g., 100, etc.) such as the stage in an event, the football in a football game, a main character in a movie, a salient visual feature, etc., may be identified/recognized and assessed with various user interest levels based on one or more of analysis rules, image analysis tools, any combination of one or more computer vision techniques such as Haar Filters, wavelet decomposition, Fourier space based spatial resolution tracking, etc. Additionally, optionally, or alternatively, visual objects, visual elements, etc., in the video image(s) (e.g., 100, etc.) can be found semantically based on other visual objects, visual elements, etc., present in the same image. For example, players can be found semantically after a football is discovered in the same image.

The visual objects, visual elements, etc., as determined in the video image(s) (e.g., 100, etc.) may be used to generate or identify scenes in the video image(s) (e.g., 100, etc.). A scene including the stage in video images of an event, the football in video images of a football game, etc., may be assessed with the highest user interest level and thus be determined as a scene of high interest (e.g., 110-2, etc.). A scene that does not include the stage or the football may be assessed with a relatively low user interest level and thus be determined as a scene of low interest (e.g., 110-1, 110-3, etc.).

In some embodiments, scenes of various user interest levels in video image(s) (e.g., 100, etc.) may be generated or identified based at least in part on user viewing behavior data collected while users of a user population are viewing the one or more video images. For example, a heat map may be generated based on the user viewing behavior data indicating which specific viewing angles, area portions, etc., of the input video images are respectively extremely high user interest levels, moderately high user interest levels, low user interest levels, extremely low user interest levels, etc. The heat map may be used to identify/determine scenes in the video image(s) and assess/determine respective user interest levels of the scenes.

In some embodiments, the heat map may be (e.g., dynamically, up to a certain time point, etc.) updated based on a user feedback loop. Initially, no scenes of various user interest levels may be determined based on the heat map. Thus, users viewing video image(s) through video data streamed based on initial versions of the heat map may be exposed to visual artifacts, physiological discomforts, etc., for example, in operational scenarios in which the heat map is exclusively used for identifying scenes of various user interest levels. User viewing behavior data may be collected by users' devices while users of a user population are viewing the video image(s). Additionally, optionally, alternatively, machine learning may be implemented to analyze the collected user viewing behavior data. The user viewing behavior data may provide a spatial distribution (or a statistical distribution) of the users' viewing angles, the users' viewing time durations at any given viewing angles, etc., in relation to different area portions of the video image(s). The spatial distribution of the users' viewing angles, the users' viewing time durations at any given viewing angles, etc., may be used to identify scenes of various interest levels in the video image(s). As more and more user viewing behavior data are collected and incorporated into the heat map, the scenes of various interest levels can be detected relatively accurately.

In some embodiments, video metadata specifying (e.g., in terms of coordinates, locations, boundaries, etc.,) some or all of: the scenes of various user interest level, the regional cross sections generated from the scenes of various user interest level, geometric information related to the scenes and/or the regional cross sections, etc., in the video image (100) may be provided with the video image (100) to a downstream module/device, such as a video streaming server or a module therein, etc., for further processing. In some embodiments, the video metadata can be updated from time to time, continuously, periodically, programmatically, without manual input, etc., with one or more of new user input, new user viewing data, new iterations of image content analyses, etc.

5. EXAMPLE SCENES, REGIONAL CROSS SECTIONS AND VIDEO SUB-STREAMS

FIG. 2A illustrates example regional cross sections of video image(s) that are being viewed by a user at a logically represented spatial location 202 in a video related application such as a VR application, an AR application, a remote presence application, a display application, etc. The user at the logically represented spatial location (202) may be deemed as logically present in a globe (or a sphere) formed by the video image(s). The user's logically represented spatial location (202) may, but is not limited to only, at a central location of the globe. At any given time, the user may view an image portion of each video image in the video image(s) through a viewport 108-2, for example, as provided by a HMD, a mobile device, a display device, etc., that is a part of, or is operating in conjunction with, a video streaming client.

A video streaming server may determine, through any combination of user input, image content analyses, user feedback loops, machine learning, etc., that the video image(s) comprises a first scene of high interest (110-4), a second scene of high interest (110-5), a first scene of low interest (110-6), and a second scene of low interest (110-7). In some embodiments, all the scenes (e.g., 110-4, 110-5, 110-6, 110-7, etc.) detected from the video image(s) cover the entire area in an image representation (e.g., a rectangular image frame, a globe or sphere in a 3D space, etc.) of the video image(s). Regional cross sections 102-4, 102-5, 102-6 and 102-7 may be generated or identified from the video image(s) based at least in part on the scenes detected from the video image(s). In some embodiments, as illustrated in FIG. 2A, each of the regional cross sections 102-4, 102-5, 102-6 and 102-7 generated or identified from the video image(s) (e.g., one-to-one, etc.) corresponds to a respective scene in the scenes (e.g., 110-4, 110-5, 110-6, 110-7, etc.) detected from the video image(s).

In some embodiments, the first scene of high interest (110-4) may be of a size smaller than, and may be completely encompassed by, the user's viewport (108-2). In some embodiments, the second scene of high interest (110-5) may be of a size larger than, and might not have been completely encompassed by, the user's viewport (108-2), even if the user's viewport (108-2) had been shifted to a viewing angle towards the second scene of interest (110-5).

Figure 3A:
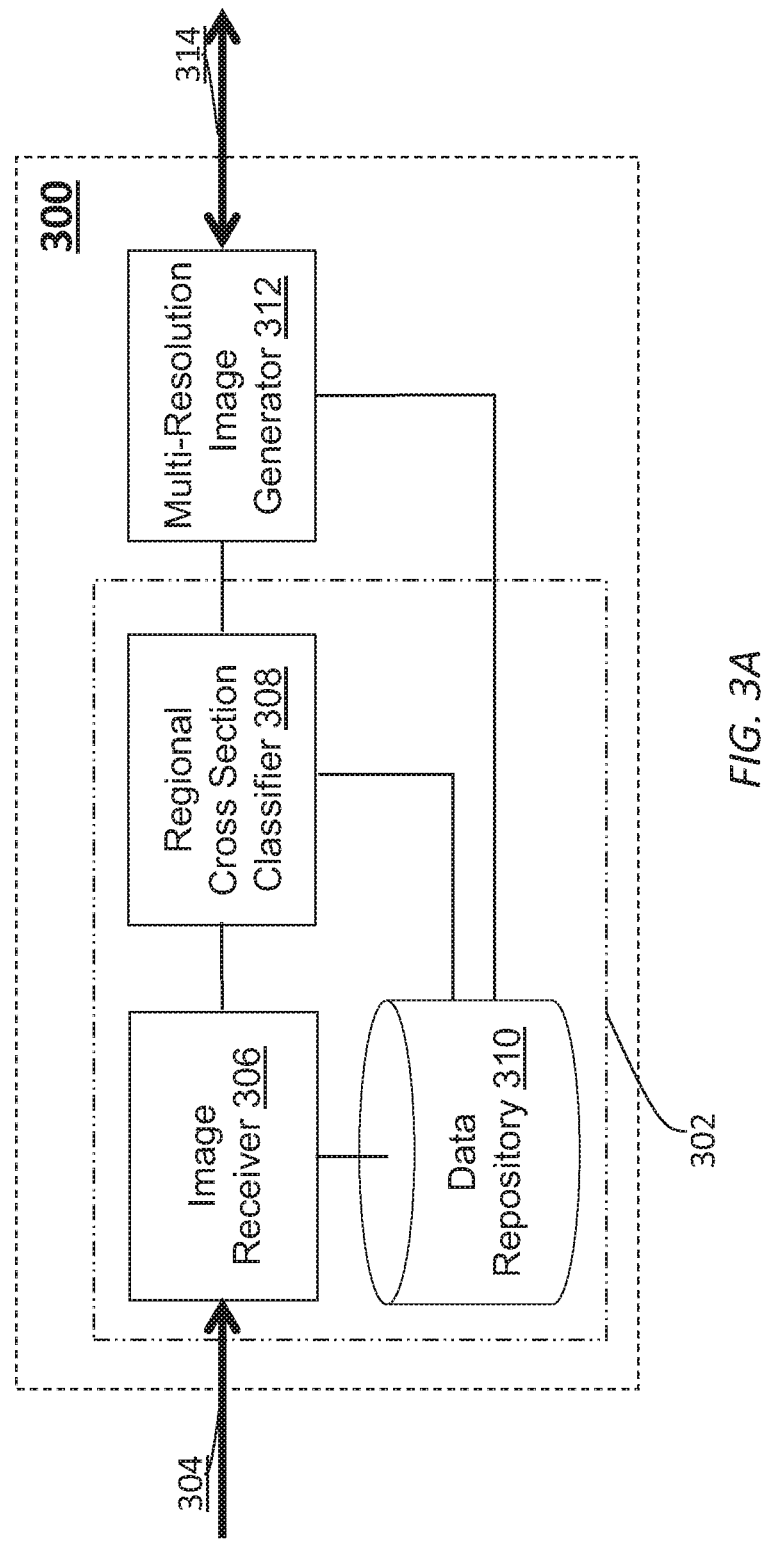
FIG. 3A through FIG. 3C illustrate example video streaming servers and clients.
Figure 3B:
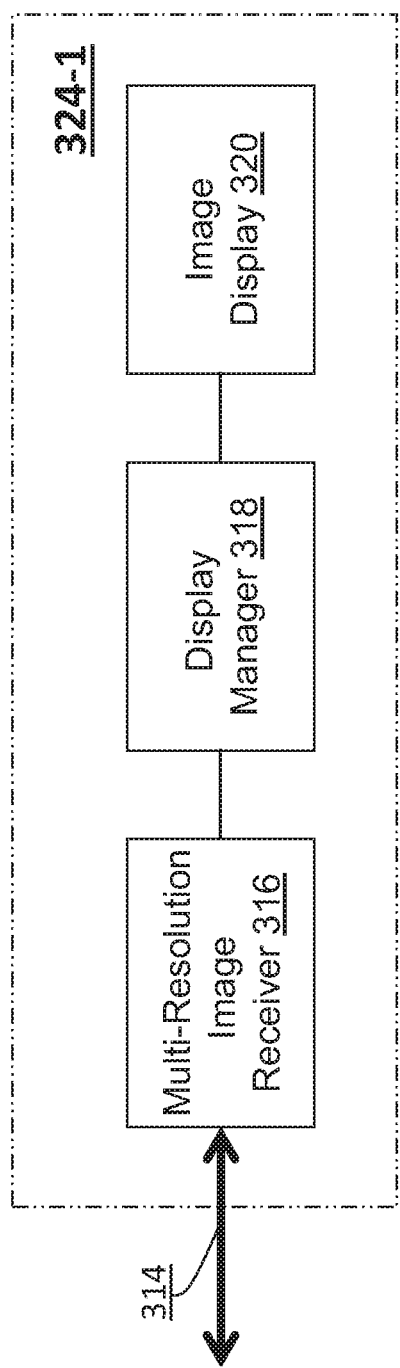
Figure 3C:
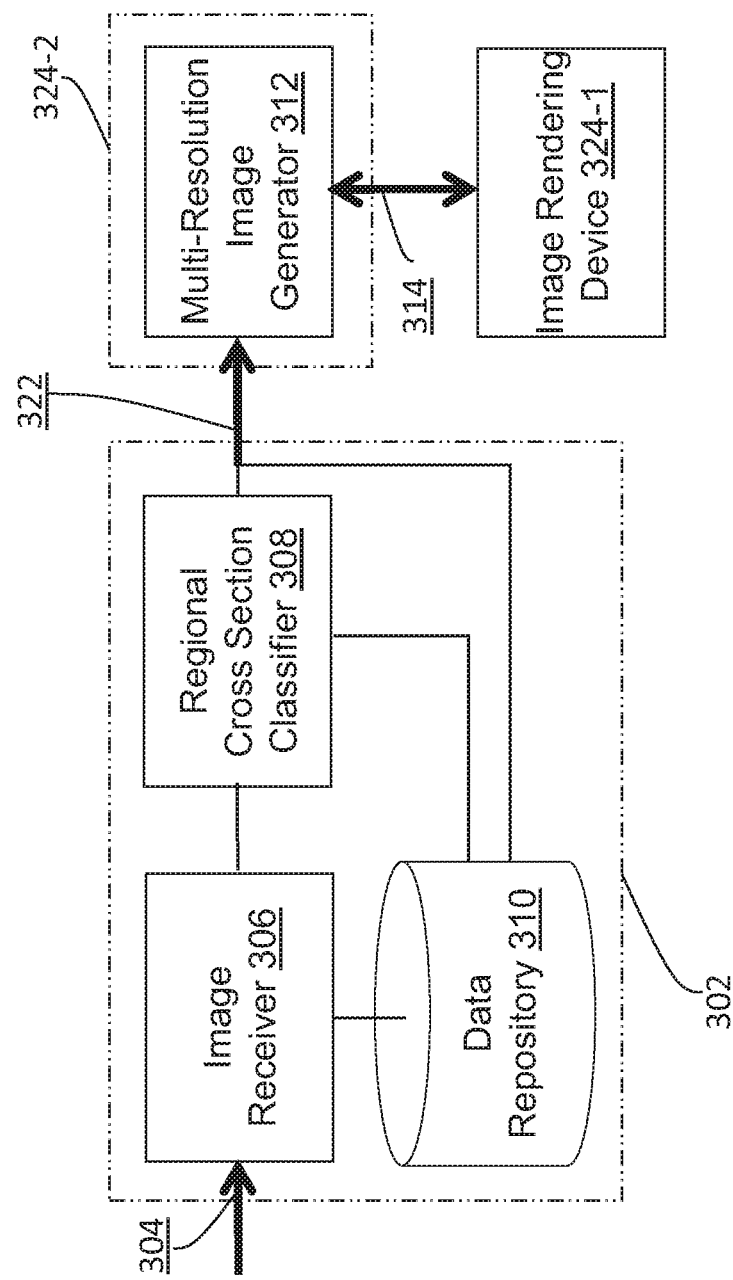

Based on user tracking data (e.g., as received from the video streaming client via a bidirectional data flow 314 of FIG. 3A, FIG. 3B or FIG. 3C, etc.), viewing angles, sizes, aspect ratios, etc., of the user's fields of view (e.g., 108-2, 108-1 of FIG. 1, etc.) over time in relation to the video image(s) can be received, determined, or otherwise computed, by the video streaming server.

In some embodiments, the image portion in (or for) the regional cross section (102-4) corresponding to the first scene of high interest (110-4) in the user's viewport (108-2) may be encoded as a first video sub-stream at first spatiotemporal resolutions, for example, the highest spatiotemporal resolutions among all video sub-streams in an overall video stream from the video streaming server to the video streaming client for the purpose of rendering video content to the user.

In some embodiments, the image portion in (or for) the regional cross section (102-5) corresponding to the second scene of high interest (110-5) not in the user's viewport (108-2) may be encoded as a second video sub-stream at second spatiotemporal resolutions. The second spatiotemporal resolutions may range from relatively low spatiotemporal resolutions (e.g., ¼, ½, etc.) up to the highest spatiotemporal resolutions. Additionally, optionally, or alternatively, further compressions, relatively aggressive compressions, predictions with relatively large errors, etc., may be performed to compress the second video sub-stream relative to those performed on the first video sub-stream, for example, to be in compliance with a bitrate budget allocated for the second video sub-stream.

As each of these scenes of high interest (110-4 and 110-5) in the video image(s) are encoded as a single stream, when the user moves the viewport within a scene of high interest, additional high-resolution periphery video data relative to the user's viewport or the user's foveal vision has already been continuously transmitted from the video streaming server to the video streaming client, thereby preventing visual artifacts, physiological discomforts, etc., that might be generated by sudden decreases (or discontinuities) of resolutions and slow transitioning from low resolutions to high resolutions.

In some embodiments, the image portions in (or for) the regional cross sections (102-6 and 102-7) corresponding to the first and second scenes of low interest (110-6 and 110-7) may be encoded as a third video sub-stream at third spatiotemporal resolutions. The third spatiotemporal resolutions may be lower than the second spatiotemporal resolutions. In some embodiments, only anchor frames such as I-frames, etc., are sent in the third video sub-stream at an image refresh rate lower than those of the first and second video sub-streams; other non-anchor frames such as B-frames, P-frames, etc., may not be sent in the overall video stream that includes the third video sub-stream. When the user's viewport moves into the first and second scenes of low interest (110-6 and 110-7), both anchor frames (e.g., I-frames, etc.) and non-anchor frames (e.g., B-frames, P-frames, etc.) may be sent to the video streaming client in the third video sub-stream, which may be adapted to a higher bitrate than when the user's viewport is away from the first and second scenes of low interest (110-6 and 110-7). For any missing frames in the same group of pictures (GOP) after the last anchor frame, error concealment operations such as repeating the I-frame, delaying the viewport change until the next GOP, etc., may be performed.

Additionally, optionally, or alternatively, much further compressions, much aggressive compressions, predictions with relatively large errors, etc., may be performed to compress the third video sub-stream relative to those performed on the first and second video sub-streams, for example, to be in compliance with a bitrate budget allocated for the third video sub-stream.

Figure 2B:
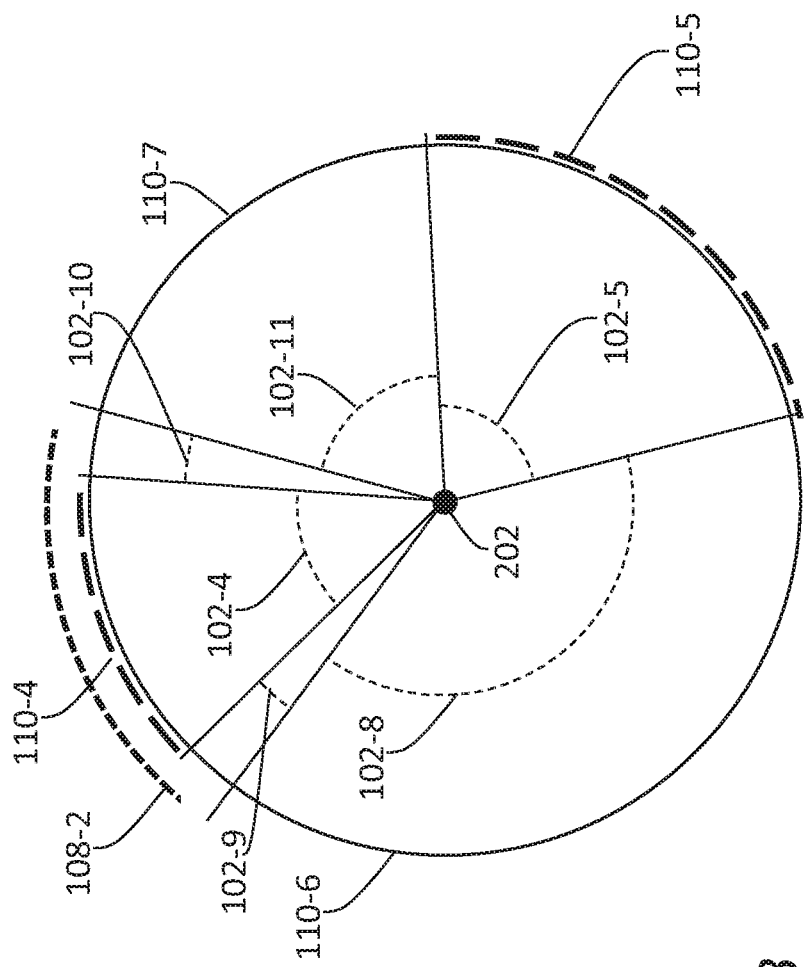

FIG. 2B illustrates additional example regional cross sections of video image(s) that are being viewed by the user at the logically represented spatial location (202) in a video related application such as a VR application, an AR application, a remote presence application, a display application, etc.

Regional cross sections 102-4, 102-7, 102-8, 102-9, 102-10 and 102-11 may be generated or identified from the video image(s) based at least in part on the scenes detected from the video image(s). In some embodiments, as illustrated in FIG. 2B, each of the regional cross sections 102-4, 102-5 and 102-6 generated or identified from the video image(s) (e.g., one-to-one, etc.) does not necessarily have a one-to-one correspondence with a scene in the scenes (e.g., 110-4, 110-5, 110-6, 110-7, etc.) detected from the video image(s).

For example, as compared with FIG. 2A, in FIG. 2B, the first scene of low interest (110-6) comprises a first scene portion in the viewport (108-2) and a second scene portion outside the viewport (108-2). In some embodiments, the first scene of low interest (110-6) may be used to create two regional cross sections 102-8 and 102-9, one of which overlaps with the viewport (108-2) and the other of which does not overlap with the viewport (108-2). These regional cross sections (102-8 and 102-9) may or may not be spatially coextensive with the first and second scene portions in the first scene of low interest (110-6).

Similarly, as compared with FIG. 2A, in FIG. 2B, the second scene of low interest (110-7) comprises a third scene portion in the viewport (108-2) and a fourth scene portion outside the viewport (108-2). In some embodiments, the second scene of low interest (110-7) may be used to create two regional cross sections 102-10 and 102-11, one of which overlaps with the viewport (108-2) and the other of which does not overlap with the viewport (108-2). These regional cross sections (102-10 and 102-11) may or may not be spatially coextensive with the third and fourth scene portions in the second scene of low interest (110-7).

In some embodiments, the image portion in (or for) the regional cross section (102-4) corresponding to the first scene of high interest (110-4) in the user's viewport (108-2) may be encoded as the first video sub-stream at the first spatiotemporal resolutions as in FIG. 2A.

In some embodiments, the image portion in (or for) the regional cross section (102-5) corresponding to the second scene of high interest (110-5) not in the user's viewport (108-2) may be encoded as the second video sub-stream at the second spatiotemporal resolutions as in FIG. 2A.

In some embodiments, the image portions in (or for) the regional cross sections (102-9 and 102-10) corresponding to the in-viewport scene portions of the first and second scenes of low interest (110-6 and 110-7) may be encoded as a fourth video sub-stream at fourth spatiotemporal resolutions. The fourth spatiotemporal resolutions may be lower than the second spatiotemporal resolutions. In some embodiments, only I-frames are sent in the fourth video sub-stream at an image refresh rate lower than those of the first and second video sub-streams. Additionally, optionally, or alternatively, much further compressions, much aggressive compressions, predictions with relatively large errors, etc., may be performed to compress the fourth video sub-stream relative to those performed on the first and second video sub-streams, for example, to be in compliance with a bitrate budget allocated for the fourth video sub-stream.

In some embodiments, the image portions in (or for) the regional cross sections (102-8 and 102-11) corresponding to the out-of-viewport scene portions of the first and second scenes of low interest (110-6 and 110-7) may be encoded as a fifth video sub-stream at fifth spatiotemporal resolutions. The fifth spatiotemporal resolutions may be lower than the fourth spatiotemporal resolutions. In some embodiments, only I-frames are sent in the fourth video sub-stream at an image refresh rate lower than those of the first, second and fourth video sub-streams. Additionally, optionally, or alternatively, the strongest compressions, the most aggressive compressions, predictions with the largest under-threshold errors, etc., may be performed to compress the fifth video sub-stream relative to those performed on the first, second and fourth video sub-streams, for example, to be in compliance with a bitrate budget allocated for the fifth video sub-stream.

Figure 2C:
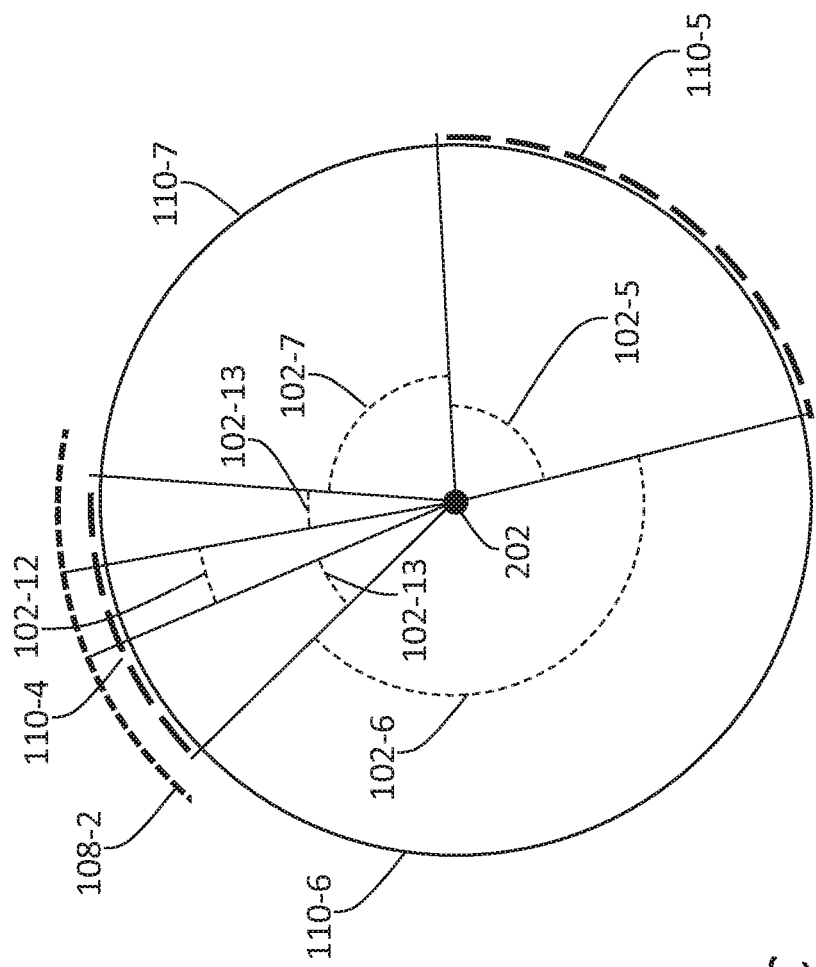

FIG. 2C illustrates further example regional cross sections of video image(s) that are being viewed by the user at the logically represented spatial location (202) in a video related application such as a VR application, an AR application, a remote presence application, a display application, etc.

Regional cross sections 102-5, 102-6, 102-7, 102-12 and 102-13 may be generated or identified from the video image(s) based at least in part on the scenes detected from the video image(s). In some embodiments, as illustrated in FIG. 2B, each of the regional cross sections 102-4, 102-5 and 102-6 generated or identified from the video image(s)

(e.g., one-to-one, etc.) does not necessarily have a one-to-one correspondence with a scene in the scenes (e.g., 110-4, 110-5, 110-6, 110-7, etc.) detected from the video image(s).

For example, as compared with FIG. 2A, in FIG. 2C, the first scene of high interest (110-4) comprises a first scene portion in the user's foveal vision (not shown) in the viewport (108-2) and a second scene portion outside the user's foveal vision in the viewport (108-2). In some embodiments, the first scene of high interest (110-4) may be used to create two regional cross sections 102-12 and 102-13, one of which overlaps with the user's foveal vision in the viewport (108-2) and the other of which does not overlap with the user's foveal vision in the viewport (108-2). The regional cross section (102-12) may or may not be spatially coextensive with the user's foveal vision in the viewport (108-2).

In some embodiments, the image portion in (or for) the regional cross section (102-13) corresponding to the first scene of high interest (110-4) outside the user's foveal vision in the user's viewport (108-2) may be encoded as the first video sub-stream at the first spatiotemporal resolutions as in FIG. 2A.

In some embodiments, the image portion in (or for) the regional cross section (102-5) corresponding to the second scene of high interest (110-5) not in the user's viewport (108-2) may be encoded as the second video sub-stream at the second spatiotemporal resolutions as in FIG. 2A.

In some embodiments, the image portions in (or for) the regional cross sections (102-6 and 102-7) corresponding to the first and second scenes of low interest (110-6 and 110-7) may be encoded as the third video sub-stream at the third spatiotemporal resolutions as in FIG. 2A.

In some embodiments, the image portions in (or for) the regional cross section (102-12) encompassing the user's foveal vision in the viewport (108-2) may be encoded as a sixth video sub-stream at sixth spatiotemporal resolutions. The sixth spatiotemporal resolutions may be higher than the first spatiotemporal resolutions. In some embodiments, video frames in the sixth video sub-stream are sent at an image refresh rate (e.g., 120 frames or higher per second, 60 frames or higher per second, etc.) higher than that of the first video sub-stream. Additionally, optionally, or alternatively, little or no compressions, much less aggressive compressions, predictions with relatively small errors, etc., may be performed to compress the sixth video sub-stream relative to those performed on the first video sub-stream, for example, to generate the highest quality imagery as compared with those generated with other video sub-streams.

In some embodiments, when the user's viewport is in a static part of the sphere image(s) where no scene of high interest is identified, then a single video sub-stream may be created out of a regional cross section that is the size of the viewport or larger; the image portion of the regional cross section is transmitted in the single video sub-stream.

In some embodiments, regional cross sections that are less than the size of the viewport may be created. This may be useful in operational scenarios in which most of the image portion in the viewport or in a scene is static. Encoding the static image portion that is undergoing no or very little changes may not be efficient. Under techniques as described herein, a regional cross section may be designated for a dynamic image portion that may be smaller than the viewport or the scene. The dynamic image portion in the regional cross section may be encoded in a video sub-stream at relatively high spatiotemporal resolutions (e.g., relatively high spatial resolutions, relatively high time resolutions, at a relatively high refresh rate, containing relatively high spatial frequency content, etc.). Additionally, optionally, or alternatively, most of the image content that is not present in the video sub-stream is refreshed from video buffers or sent occasionally as a separate video sub-stream.

Figure 2D:
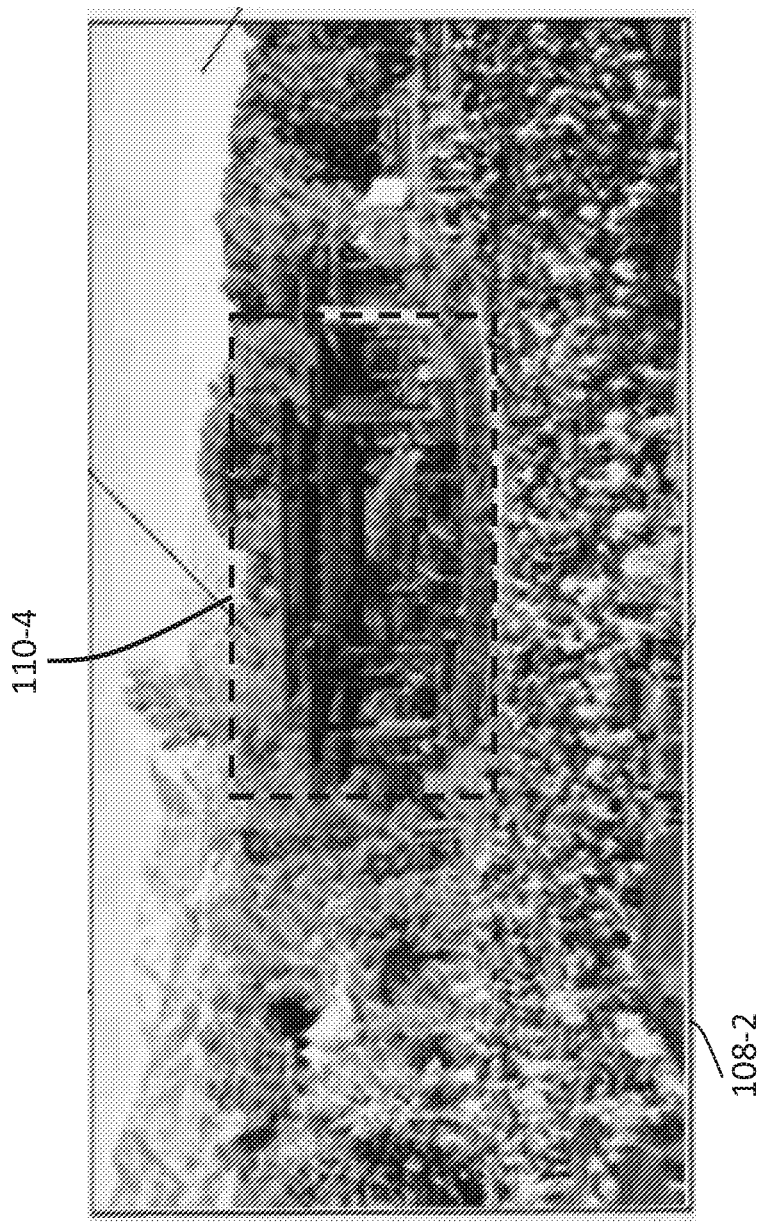
FIG. 2D illustrates an example viewport.

FIG. 2D illustrates an example viewport (e.g., 108-2) (e.g., which may be the user's field of view at the logical spatial location (202) of FIG. 2A through FIG. 2C, etc.) to an image portion of video image(s). As illustrated, the viewport (108-2) may completely encompass a scene of high interest (e.g., 110-4, etc.). The viewport (108-2) may overlap with one or more scenes of low interest outside the scene of high interest (110-4). In some embodiments, the image portion in the scene of high interest (110-4) in the viewport (108-2) may be encoded in a video sub-stream with relatively high spatiotemporal resolutions, whereas the image portion in the scenes of low interest overlapping with the viewport (108-2) may be encoded in one or more video sub-streams with relatively low spatiotemporal resolutions. In a non-limiting example embodiments, the image portion in the scenes of low interest overlapping with the viewport (108-2) may comprise a dynamic part that captures the audience of some performers on a stage, and a static part that captures slow or no change background scenario. In some embodiments, the dynamic part and the static part in the scenes of low interest overlapping (or even non-overlapping) with the viewport (108-2) may be encoded in separate video sub-streams with differential spatiotemporal resolutions. For example, the higher differential spatiotemporal resolutions may be assigned to encoding the image portion of the dynamic part, whereas the lower differential spatiotemporal resolutions may be assigned to encoding the image portion of the static part. Additionally, optionally, or alternatively, a higher refresh rate may be assigned to encoding the image portion of the dynamic part, whereas a lower refresh rate may be assigned to encoding the image portion of the static part.

Figure 2E:
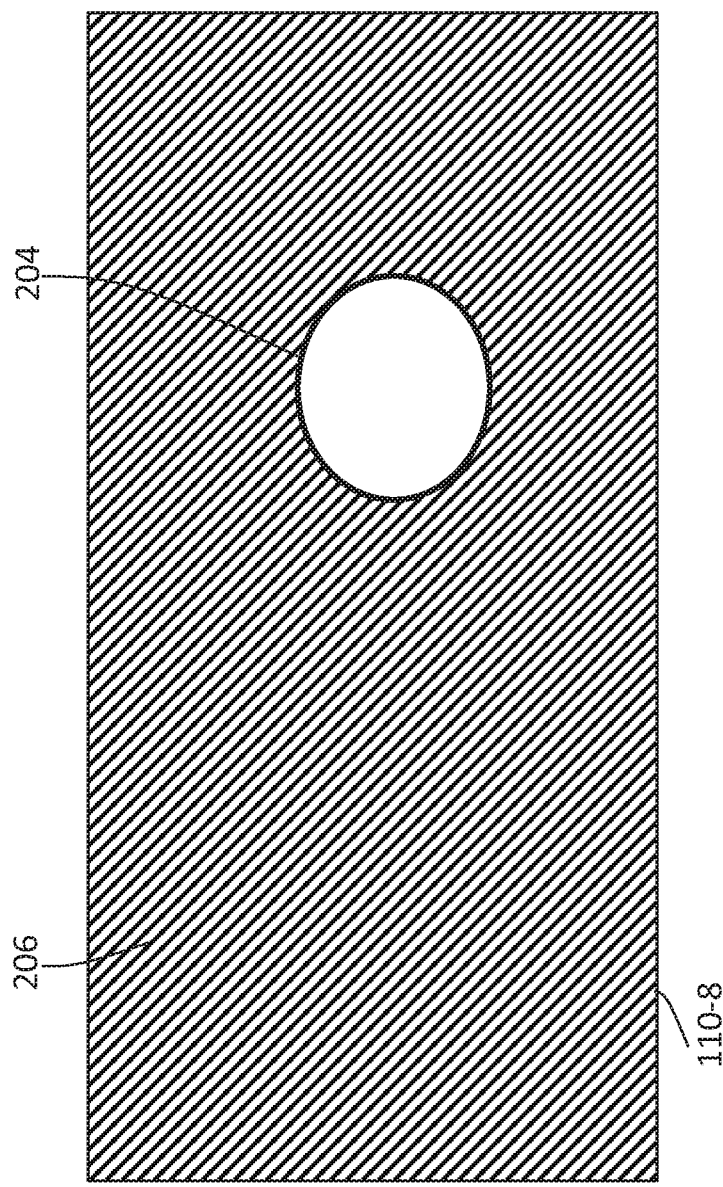
FIG. 2E illustrates an example scene.

FIG. 2E illustrates an example scene 110-8 in video image(s) that are being viewed in a viewport (e.g., 108-1 of FIG. 1, 102-2 of FIG. 2A through FIG. 2D, etc.) by a user in a video related application such as a VR application, an AR application, a remote presence application, a display application, etc.

The scene (110-8) may comprise a scene portion 204 that encompasses the user's foveal vision and a remaining scene portion 206 that does not overlap with the user's foveal vision. In some embodiments, the entire scene (110-8) may be included in two or more regional cross sections the image portions of which are encoded in multiple video sub-streams at different spatiotemporal resolutions. For example, the scene portion (204) (which may be no less than the user's foveal vision) may be included in a regional cross section the image portion of which is encoded in a video sub-stream at high spatiotemporal resolutions, whereas the scene portion (206) (which is outside the user's foveal vision) may be included in a different regional cross section the image portion of which is encoded in a different video sub-stream at lower spatiotemporal resolutions.

In some embodiments, the entire scene (110-8) may be included in a regional cross section the image portion of which is encoded in a video sub-stream at the same spatiotemporal resolutions.

Additionally, optionally, or alternatively, a (e.g., low-strength, etc.) blurring filter with variable spatial resolutions may be applied to the image portion of the entire scene (110-8) to decimate high spatial frequency content from parts of the image portion of the entire scene (110-8) that are located outside the user's foveal vision. The blurring filter may perform no or little blurring in the scene portion (204) that encompasses the user's foveal vision. The blurring filter may perform stronger blurring in the scene portion (206); for example, the strength of blurring in the scene portion (206) at any given spatial location in the scene portion (206) may be based at least in part on the spatial distance between the spatial location and the center of the user's foveal vision.

As a result of applying blurring filtering to the scene (110-8), the amount of video data to be carried may be significantly reduced in video sub-stream(s) while maintaining or ensuring visual clarity within the user's foveal vision.

6. EXAMPLE VIDEO STREAMING SERVERS AND CLIENTS

FIG. 3A illustrates an example video streaming server 300 that comprises an image processor 302, a multi-resolution image generator 312, etc. In some embodiments, the image processor (302) comprises an image receiver 306, a regional cross section classifier 308, a data repository 310, etc. Some or all of the components of the video streaming server (300) may be implemented by one or more devices, modules, units, etc., in software, hardware, a combination of software and hardware, etc.

In some embodiments, the image receiver (306) comprises software, hardware, a combination of software and hardware, etc., configured to receive an input image stream 304 from an image source such as a cloud-based image source, a camera system in connection with a VR application, an AR application, a remote presence application, a display application, etc.; decode the input image stream (304) into one or more input video images (e.g., a sequence of input video images, etc.); etc.

In some embodiments, the regional cross section classifier (308) comprises software, hardware, a combination of software and hardware, etc., configured to classify (e.g., all, substantially all, all excluding caption text boxes, etc.) regional cross sections in the input video images into different types. The classification of the input video images into the regional cross sections of different types may be, but are not limited to only, image-based, Group-of-Picture (GOP)-based, scene-based, multiple-scene-based, etc.

In some embodiments, the regional cross sections of different types may be classified based on video metadata in image metadata received with and decoded from the input image stream (304).

Additionally, optionally, or alternatively, in some embodiments, the regional cross sections of different types may be classified based on video metadata generated by the regional cross section classifier (308).

Based on the video metadata, the regional cross section classifier (308) can determine into which specific type(s) one, some or all regional cross sections in the input image stream (304) should be classified.

In some embodiments, video metadata as described herein may be generated by the video streaming server (300) and/or an upstream system with user input from a video professional such as a director, a colorist, a video engineer, etc. In some embodiments, the upstream system may be an upstream video streaming server, which generates the input image stream (304) with a (e.g., uniform) high spatial resolution and/or delivers the input image stream (304) to the video streaming server (300) through one or more high bandwidth network connections.

In some embodiments, video metadata as described herein may be generated by the video streaming server (300) and/or the upstream system by performing image content analyses on the input image stream (304). Such image content analyses may be performed using one or more of: analysis rules, image analysis tools, any combination of one or more computer vision techniques such as Haar Filters, wavelet decomposition, Fourier space based spatial resolution tracking, etc.

In some embodiments, video metadata as described herein may be generated by the video streaming server (300) and/or the upstream system based on user viewing behavior data collected in a user feedback loop while users of a user population are viewing the one or more video images. Machine learning may be applied to analyzing the user viewing behavior data collected in the user feedback loop. For example, a heat map may be generated based on the user viewing behavior data indicating which specific viewing angles, regional cross sections, etc., of the input video images are respectively extremely high user interest levels, moderately high user interest levels, low user interest levels, extremely low user interest levels, etc. The heat map may be included in, or may be used to generate, the video metadata. Additionally, optionally, or alternatively, in some embodiments, information such as heat maps, etc., obtained from any combination of user input, image content analyses, user feedback loops, machine learning, etc., performed on some video programs may be applied prospectively to other video programs.

In some embodiments, the data repository (310) represents one or more databases, one or more data storage units/modules/devices, etc., configured to support operations such as storing, updating, retrieving, deleting, etc., with respect to some or all of the input video images, image metadata such as video metadata, etc.

In some embodiments, the multi-resolution image generator (308) comprises software, hardware, a combination of software and hardware, etc., configured to receive, via a bidirectional data flow 314, viewing angles, sizes, aspect ratios, etc., of a user's fields of view over time in relation to a spatial coordinate system in which video content is to be rendered in the user's fields of view input video images; generate an overall video stream comprising different video sub-streams for the regional cross sections of different types encoded with different spatial resolutions and/or different frame rates; provide/transmit the overall video stream via the bidirectional data flow 314 directly or indirectly through intermediate devices, etc.) to a video streaming client, a display device, a storage device, etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the video streaming server (300).

The video streaming server (300) may be used to support real time vision applications, near-real-time vision applications, non-real-time vision applications, virtual reality, augmented reality, helmet mounted display applications, heads up display applications, games, 2D display applications, 3D display applications, multi-view display applications, etc. For example, some or all of video images, image metadata, viewport parameters (e.g., viewport center coordinates, aspect ratios, etc.), per-viewport image metadata, viewport image data, etc., are generated or accessed by the video streaming server (300) in real time, in near real time, etc.

FIG. 3B illustrates an example image rendering system 324-1 that comprises a multi-resolution image receiver 316, a display manager 318, an image display 320, etc. Some or all of the components of the image rendering system (324-1) may be implemented by one or more devices, modules, units, etc., in software, hardware, a combination of software and hardware, etc.

In some embodiments, the multi-resolution image receiver (316) comprises software, hardware, a combination of software and hardware, etc., configured to send, via a bidirectional data flow 314, viewing angles, sizes, aspect ratios, etc., of a user's fields of view over time in relation to a spatial coordinate system in which video content is to be rendered in the user's fields of view input video images; receive an overall video stream comprising different video sub-streams for regional cross sections of different types encoded with different spatial resolutions and/or different frame rates; etc.

The user may move the user's viewport to different fields of view at runtime. The image rendering system (324-1) is configured to generate video content to be rendered on the user's display. In some embodiments, video data from one or more video sub-streams in the received video stream may be stitched or composited together to form a unified imagery. De-blocking operations, de-contouring operations, blurring operations, etc., may be performed as a part of compositing the video content to be rendered on the user's display.

In some embodiments, the display manager (318) comprises software, hardware, a combination of software and hardware, etc., configured to perform display management operations on the video content to be rendered on the image display (320), where the video content is decoded and composited from the video sub-streams in the overall video stream received by the image rendering system (324-1); output display managed video content to the image display (320) for rendering; etc.

Additionally, optionally, or alternatively, some or all of image rendering operations such as face detection, head tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the image rendering system (324-1).

The image rendering system (324-1) may be used to support real time vision applications, near-real-time vision applications, non-real-time vision applications, virtual reality, augmented reality, helmet mounted display applications, heads up display applications, games, 2D display applications, 3D display applications, multi-view display applications, etc. For example, some or all of video images, image metadata, viewport parameters (e.g., viewport center coordinates, aspect ratios, etc.), per-viewport image metadata, viewport image data, etc., are generated or accessed by the image rendering system (324-1) in real time, in near real time, etc.

Techniques as described herein can be implemented in a variety of system architectures. Some or all image processing operations as described herein can be implemented by one or more of cloud-based video streaming servers, video streaming servers collocated with or incorporated into video streaming clients, image rendering systems, image rendering systems, display devices, etc. Based on one or more factors such as types of vision applications, bandwidth/bitrate budgets, computing capabilities, resources, loads, etc., of recipient devices, computing capabilities, resources, loads, etc., of video streaming servers and/or computer networks, etc., some image processing operations can be performed by a video streaming server, while some other image processing operations can be performed by a video streaming client, an image rendering system, a display device, etc.

FIG. 3C illustrates an example configuration in which a multi-resolution image generator (e.g., 312, etc.) is incorporated into an edge video streaming server 324-2. In some embodiments, an image processor 302 of FIG. 3C may be cloud-based. In some embodiments, the image processor (302) may be located in a core network separate from edge devices such as the edge video streaming server (324-2). As in FIG. 3A, the image processor (302) may comprise an image receiver 306, a regional cross section classifier 308, a data repository 310, etc. The image processor (302) may represent an upstream video streaming server that communicates with the edge video streaming server (324-2) over relatively high bitrates. Some or all of the components of the image processor (302) and/or the edge video streaming server (324-2) may be implemented by one or more devices, modules, units, etc., in software, hardware, a combination of software and hardware, etc.

In some embodiments, the image processor (302) is configured to output video images and video metadata in a data flow 322 to downstream devices one of which may be the edge video streaming server (324-2).

In some embodiments, the edge video streaming server (324-2), or the multi-resolution image generator (312) therein, comprises software, hardware, a combination of software and hardware, etc., configured to determine viewing angles, sizes, aspect ratios, etc., of a user's fields of view over time in relation to a spatial coordinate system in which video content is to be rendered in the user's fields of view input video images; generate an overall video stream comprising different video sub-streams for the regional cross sections of different types encoded with different spatial resolutions and/or different frame rates; provide/transmit the overall video stream via the bidirectional data flow 314 directly or indirectly through intermediate devices, etc.) to a video streaming client, a display device, a storage device, etc.

In some embodiments, an image rendering device (e.g., 324-1), or a display manager (e.g., 318 of FIG. 3B) therein, comprises software, hardware, a combination of software and hardware, etc., configured to perform display management operations on video content to be rendered on the image display (320), where the video content is decoded and composited from the video sub-streams in the overall video stream received by the image rendering system (324-1); output display managed video content to the image display (320) for rendering; etc.

The user may move the user's viewport to different fields of view at runtime. The image rendering system (324-2) is configured to generate video content to be rendered on the user's display. In some embodiments, video data from one or more video sub-streams in the received video stream may be stitched or composited together to form a unified imagery. De-blocking operations, de-contouring operations, blurring operations, etc., may be performed as a part of compositing the video content to be rendered on the user's display.

7. EXAMPLE PROCESS FLOWS

Figure 4A:
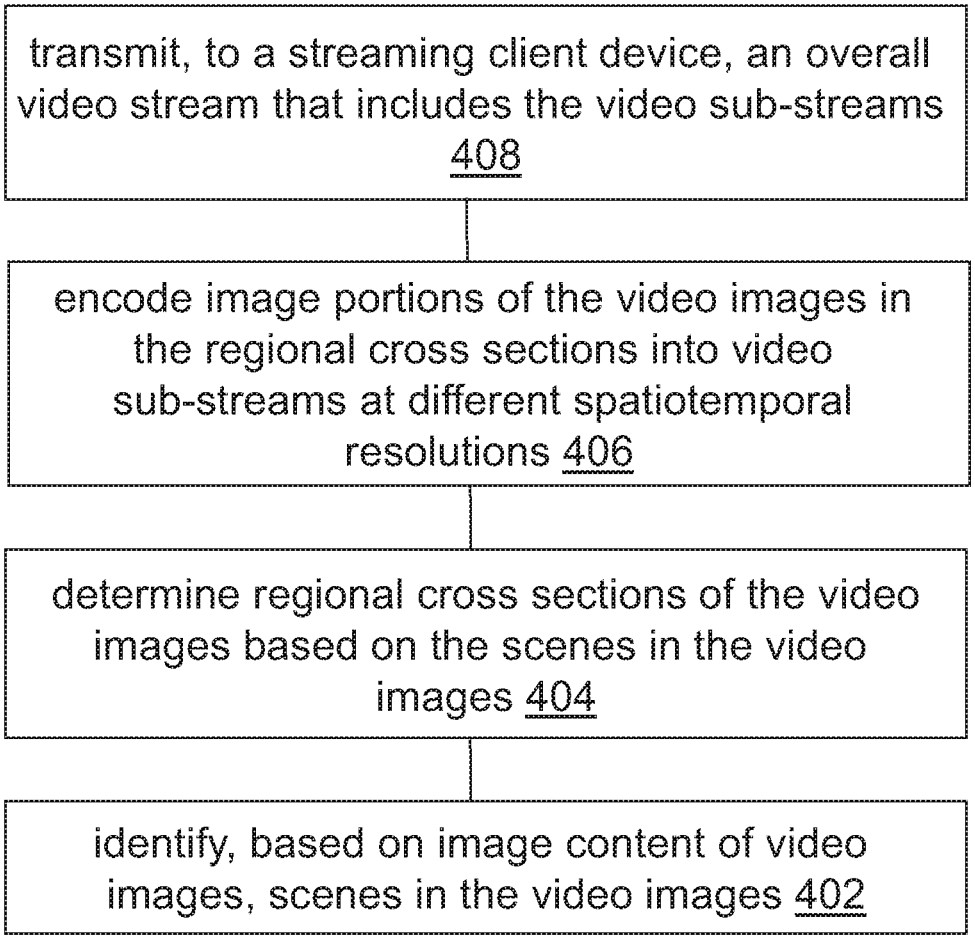
FIG. 4A and FIG. 4B illustrate example process flows.

FIG. 4A illustrates an example process flow according to an example embodiment of the present invention. In some example embodiments, one or more computing devices or components may perform this process flow. In block 402, an image processor (e.g., a video streaming server or a video streaming client of FIG. 3A through FIG. 3C, etc.) identifies, based on image content of one or more video images, a plurality of scenes in the one or more video images.

In block 404, the image processor determines a plurality of regional cross sections of the one or more video images based on the plurality of scenes in the one or more video images.

In block 406, the image processor encodes a plurality of image portions of the one or more video images in the plurality of regional cross sections into two or more video sub-streams at two or more different spatiotemporal resolutions.

In block 408, the image processor transmits, to a streaming client device, an overall video stream that includes the two or more video sub-streams.

In an embodiment, the plurality of regional cross sections include a first regional cross section that is in a viewer's viewport; the plurality of regional cross sections include a second regional cross section that is not in a viewer's viewport.

In an embodiment, the first regional cross section is free of any scene of high interest in the plurality of scenes; the second regional cross section overlaps with at least one scene of high interest in the plurality of scenes; image data in the first regional cross section is encoded at first spatiotemporal resolutions lower that second spatiotemporal resolutions at which image data in the second regional cross section is encoded.

In an embodiment, no two regional cross sections in the plurality of regional cross sections overlap with each other.

In an embodiment, at least two regional cross sections in the plurality of regional cross sections overlap with each other.

In an embodiment, at least two regional cross sections in the plurality of regional cross sections have one or more of: different spatial shapes, different sizes, different aspect ratio, etc.

In an embodiment, at least one regional cross section in the plurality of regional cross sections are identified based in part on image metadata received with the one or more video images.

In an embodiment, at least one regional cross section in the plurality of regional cross sections are identified based in part on performing image content analyzes on the one or more video images.

In an embodiment, at least one regional cross section in the plurality of regional cross sections are identified based in part on user viewing behavior data collected while users of a user population are viewing the one or more video images.

In an embodiment, the image processor is further configured to apply a blurring filter to image data in a scene that encompasses a viewer's foveal vision.

In an embodiment, the plurality of scenes comprises a scene of high interest that is encompassed by a viewer's viewport.

In an embodiment, a viewer's viewport comprises no scenes of high interest in the plurality of scenes as detected from the one or more video images.

In an embodiment, at least one video sub-stream in the two or more video sub-streams comprises only anchor frames.

In an embodiment, at least one video sub-stream in the two or more video sub-streams comprises both anchor frames and non-anchor frames.

In an embodiment, the image processor is further configured to perform: generating video metadata identifying one or more of: scenes in the plurality of scenes or regional cross sections in the plurality of regional cross sections; transmitting, to the streaming client device, the video metadata in the overall video stream that includes the two or more video sub-streams; etc.

Figure 4B:
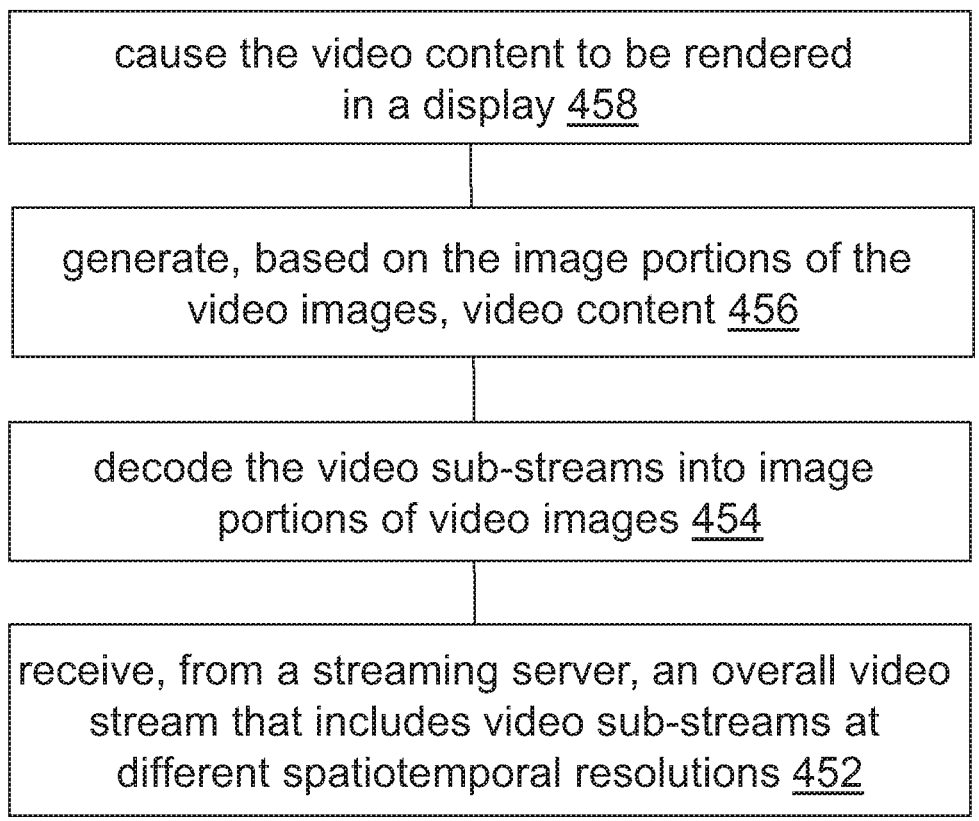

FIG. 4B illustrates an example process flow according to an example embodiment of the present invention. In some example embodiments, one or more computing devices or components may perform this process flow. In block 452, an image processor (e.g., a video streaming client of FIG. 3A through FIG. 3C, etc.) receives, from a streaming server, an overall video stream that includes two or more video sub-streams at two or more different spatiotemporal resolutions.

In block 454, the image processor decodes the two or more video sub-streams into one or more image portions of one or more video images. The one or more image portions are in one or more regional cross sections in a plurality of regional cross sections. The plurality of regional cross sections is determined based at least in part on a plurality of scenes. The plurality of scenes is detected based on image content of the one or more video images.

In block 456, the image processor generates, based on the one or more image portions of the one or more video images, video content.

In block 458, the image processor causes the video content to be rendered in a display.

In an embodiment, the image processor is further configured to send viewport information to the streaming server. The viewport information is used to derive a viewer's viewport in relation to the one or more video images.

In an embodiment, the viewport information is further used to derive the viewer's foveal vision in relation to the one or more video images.

In an embodiment, the image processor is further configured to decode video metadata from the overall video stream. The video metadata identifies one or more of: scenes in the plurality of scenes or regional cross sections in the plurality of regional cross sections.

In an embodiment, the image processor is further configured to apply one or more of de-blocking operations, de-contouring operations, blurring operations, etc., as a part of generating the video content to be rendered in the display.

In an embodiment, the image processor is further configured to perform: detecting a change in a viewer's viewport; in response to the change in the viewer's viewport, generating new video content based on periphery video data already transmitted in at least one of the two or more video sub-streams in the overall video stream.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

8. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
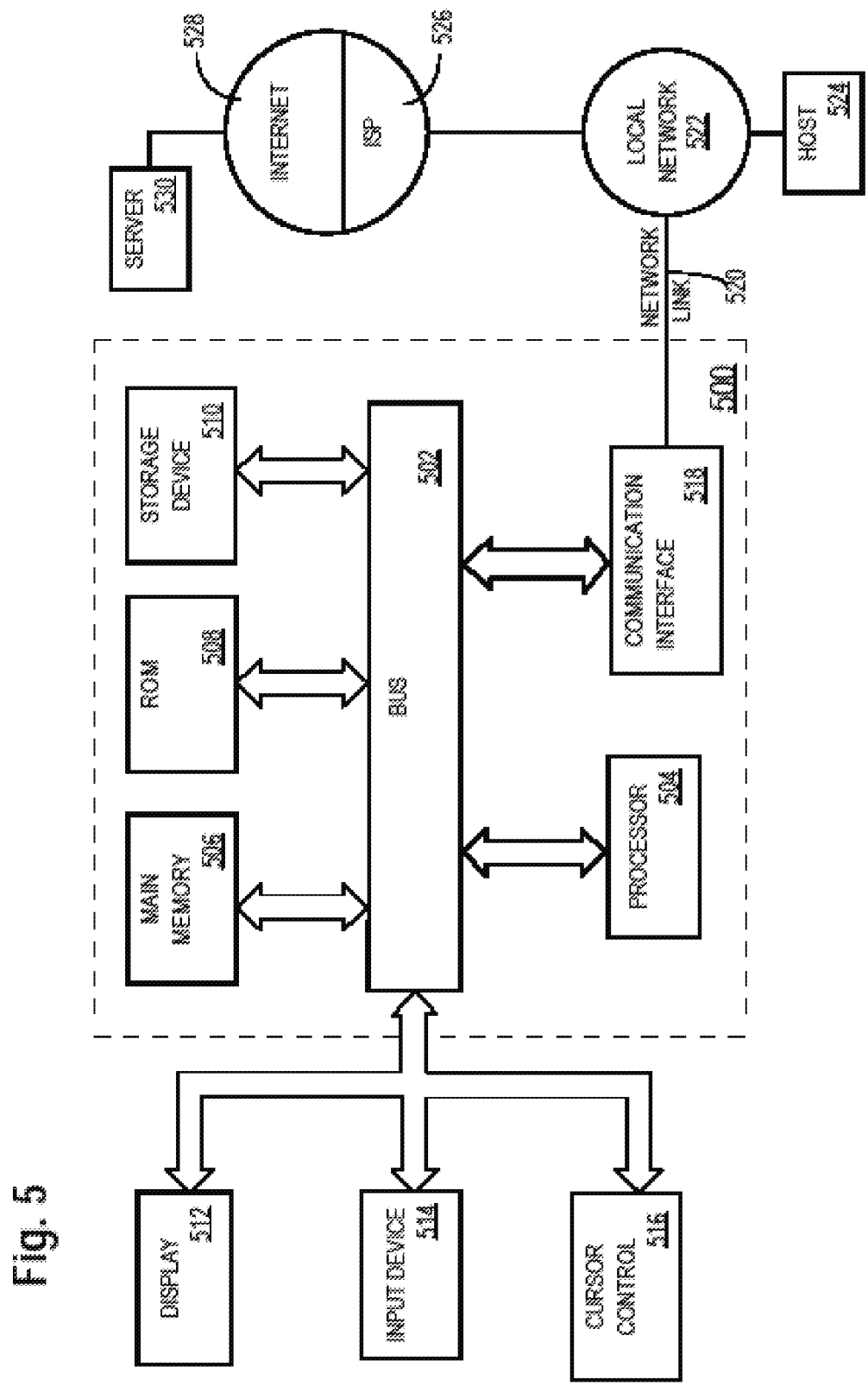
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method for streaming video data, comprising:
identifying, based on image content of one or more video images, a plurality of scenes in the one or more video images;
determining a plurality of regional cross sections of the one or more video images based on the plurality of scenes in the one or more video images;
encoding a plurality of image portions of the one or more video images in the plurality of regional cross sections into two or more video sub-streams at two or more different spatiotemporal resolutions;
transmitting, to a streaming client device, an overall video stream that includes the two or more video sub-streams;
wherein the method is performed by one or more computing devices.

EEE 2. The method of EEE 1, wherein the plurality of regional cross sections includes a first regional cross section that is in a viewer's viewport, and wherein the plurality of regional cross sections includes a second regional cross section that is not in a viewer's viewport.

EEE 3. The method of EEE 2, wherein the first regional cross section is free of any scene of high interest in the plurality of scenes, wherein the second regional cross section overlaps with at least one scene of high interest in the plurality of scenes, wherein image data in the first regional cross section is encoded at first spatiotemporal resolutions lower than second spatiotemporal resolutions at which image data in the second regional cross section is encoded.

EEE 4. The method of EEE 1, wherein no two regional cross sections in the plurality of regional cross sections overlap with each other.

EEE 5. The method of EEE 1, wherein at least two regional cross sections in the plurality of regional cross sections overlap with each other.

EEE 6. The method of EEE 1, wherein at least two regional cross sections in the plurality of regional cross sections have one or more of: different spatial shapes, different sizes, or different aspect ratio.

EEE 7. The method of EEE 1, wherein at least one regional cross section in the plurality of regional cross sections are identified based in part on image metadata received with the one or more video images.

EEE 8. The method of EEE 1, wherein at least one regional cross section in the plurality of regional cross sections are identified based in part on performing image content analysis on the one or more video images.

EEE 9. The method of EEE 1, wherein at least one regional cross section in the plurality of regional cross sections are identified based in part on user viewing behavior data collected while users of a user population are viewing the one or more video images.

EEE 10. The method of EEE 1, further comprising applying a blurring filter to image data in a scene that encompasses a viewer's foveal vision.

EEE 11. The method of EEE 1, wherein the plurality of scenes comprises a scene of high interest that is encompassed by a viewer's viewport.

EEE 12. The method of EEE 1, wherein a viewer's viewport comprises no scenes of high interest in the plurality of scenes as detected from the one or more video images.

EEE 13. The method of EEE 1, wherein at least one video sub-stream in the two or more video sub-streams comprises only anchor frames.

EEE 14. The method of EEE 1, wherein at least one video sub-stream in the two or more video sub-streams comprises both anchor frames and non-anchor frames.

EEE 15. The method of EEE 1, further comprising:
generating video metadata identifying one or more of: scenes in the plurality of scenes or regional cross sections in the plurality of regional cross sections;
transmitting, to the streaming client device, the video metadata in the overall video stream that includes the two or more video sub-streams.

EEE 16. A method for presenting video data to viewers, comprising:
receiving, from a streaming server, an overall video stream that includes two or more video sub-streams at two or more different spatiotemporal resolutions;
decoding the two or more video sub-streams into one or more image portions of one or more video images, wherein the one or more image portions are in one or more regional cross sections in a plurality of regional cross sections, wherein the plurality of regional cross sections is determined based at least in part on a plurality of scenes, wherein the plurality of scenes is detected based on image content of the one or more video images;
generating, based on the one or more image portions of the one or more video images, video content;
causing the video content to be rendered in a display;
wherein the method is performed by one or more computing devices.

EEE 17. The method of EEE 16, further comprising sending viewport information to the streaming server, wherein the viewport information is used to derive a viewer's viewport in relation to the one or more video images.

EEE 18. The method of EEE 17, wherein the viewport information is further used to derive the viewer's foveal vision in relation to the one or more video images.

EEE 19. The method of EEE 16, further comprising decoding video metadata from the overall video stream, wherein the video metadata identifies one or more of: scenes in the plurality of scenes or regional cross sections in the plurality of regional cross sections.

EEE 20. The method of EEE 16, further comprising applying one or more of de-blocking operations, de-contouring operations, or blurring operations as a part of generating the video content to be rendered in the display.

EEE 21. The method of EEE 16, further comprising:
detecting a change in a viewer's viewport;
in response to the change in the viewer's viewport, generating new video content based on periphery video data already transmitted in at least one of the two or more video sub-streams in the overall video stream.

EEE 22. An apparatus performing any of the methods as recited in EEEs 1-21.

EEE 23. A system performing any of the methods as recited in EEEs 1-21.

EEE 24. A non-transitory computer readable storage medium, storing software instructions, which when executed by one or more processors cause performance of the method recited in any of EEEs 1-21.

EEE 25. A computing device comprising one or more processors and one or more storage media, storing a set of instructions, which when executed by one or more processors cause performance of the method recited in any of EEEs 1-21.

What is claimed is:

1. A method for streaming video data, comprising:
identifying, based on image content of one or more video images, a plurality of scenes in the one or more video images; wherein the plurality of scenes comprises at least one scene of high interest and at least one scene of low interest;
tracking a viewer's viewport of the one or more video images;
determining a plurality of regional cross sections of the one or more video images based on the plurality of scenes in the one or more video images and based on the viewer's viewport; wherein the plurality of regional cross sections comprises a first regional cross section corresponding to a scene of high interest within the viewer's viewport, a second regional cross section corresponding to a scene of high interest outside the viewer's viewport, and a third regional cross section corresponding to a scene of low interest outside the viewer's viewport;
applying a blurring filter with variable spatial resolutions to image data in a scene that encompasses a viewer's foveal vision, wherein no or little blurring is performed in a scene portion that encompasses the viewer's foveal vision, wherein stronger blurring is performed in the scene portion outside the viewer's foveal vision, and wherein the strength of the blurring is based at least in part on a spatial distance between a spatial location and the center of the viewer's foveal vision;
encoding a plurality of image portions of the one or more video images in the plurality of regional cross sections into two or more video sub-streams at two or more different spatiotemporal resolutions; wherein the two or more video sub-streams comprise a first video sub-stream with a first spatiotemporal resolution for the first regional cross section, a second video sub-stream with a second spatiotemporal resolution for the second regional cross section, and a third video sub-stream with a third spatiotemporal resolution for the third regional cross section; wherein the third spatiotemporal resolution is lower than the second spatiotemporal resolution; and wherein the second spatiotemporal resolution is lower than the first spatiotemporal resolution;
transmitting, to a streaming client device, an overall video stream that includes the two or more video sub-streams;
wherein the method is performed by one or more computing devices.

2. The method of claim 1, wherein the plurality of regional cross sections comprises a fourth cross section corresponding to a scene of high interest within a viewer's foveal vision; wherein the two or more video sub-streams comprise a fourth video sub-stream with a fourth spatiotemporal resolution for the fourth regional cross section; and wherein the fourth spatiotemporal resolution is higher than the first spatiotemporal resolution.

3. The method of claim 1, wherein at least one regional cross section in the plurality of regional cross sections is identified based in part on performing image content analysis on the one or more video images.

4. The method of claim 1, wherein at least two regional cross sections in the plurality of regional cross sections have one or more of: different spatial shapes, different sizes, or different aspect ratio.

5. The method of claim 1, wherein at least one video sub-stream in the two or more video sub-streams comprises only anchor frames.

6. The method of claim 1, further comprising:
generating video metadata identifying one or more of: scenes in the plurality of scenes or regional cross sections in the plurality of regional cross sections;
transmitting, to the streaming client device, the video metadata in the overall video stream that includes the two or more video sub-streams.

7. A computing device comprising one or more processors and one or more storage media, storing a set of instructions, which when executed by one or more processors cause performance of the method recited in claim 1.

8. A method for presenting video data to viewers, comprising:
receiving, from a streaming server, an overall video stream that includes two or more video sub-streams at two or more different spatiotemporal resolutions; wherein the two or more video sub-streams comprise a first video sub-stream with a first spatiotemporal resolution for a first regional cross section; a second video sub-stream with a second spatiotemporal resolution for a second regional cross section; and a third video sub-stream with a third spatiotemporal resolution for a third regional cross section; wherein the third spatiotemporal resolution is lower than the second spatiotemporal resolution; and wherein the second spatiotemporal resolution is lower than the first spatiotemporal resolution;
decoding the two or more video sub-streams into one or more image portions of one or more video images, wherein the one or more image portions are in one or more regional cross sections in a plurality of regional cross sections, wherein the plurality of regional cross sections is determined based at least in part on a plurality of scenes and based on a viewer's viewport, wherein the plurality of scenes is detected based on image content of the one or more video images;

wherein the plurality of regional cross sections comprises the first regional cross section corresponding to a scene of high interest within the viewer's viewport, the second regional cross section corresponding to a scene of high interest outside the viewer's viewport, and the third regional cross section corresponding to a scene of low interest outside the viewer's viewport, and wherein a blurring filter with variable spatial resolutions is applied to image data in a scene that encompasses a viewer's foveal vision, wherein no or little blurring is performed in a scene portion that encompasses the viewer's foveal vision, wherein stronger blurring is performed in the scene portion outside the viewer's foveal vision, and wherein the strength of the blurring is based at least in part on a spatial distance between a spatial location and the center of the viewer's foveal vision;

generating, based on the one or more image portions of the one or more video images, video content;

causing the video content to be rendered in a display;

wherein the method is performed by one or more computing devices.

9. The method of claim 8, further comprising sending viewport information to the streaming server, wherein the viewport information is used to derive the viewer's viewport in relation to the one or more video images.

10. The method of claim 8, further comprising decoding video metadata from the overall video stream, wherein the video metadata identifies one or more of: scenes in the plurality of scenes or regional cross sections in the plurality of regional cross sections.

11. The method of claim 8, further comprising:

detecting a change in the viewer's viewport;

in response to the change in the viewer's viewport, generating new video content based on periphery video data already transmitted in at least one of the two or more video sub-streams in the overall video stream.

12. A computing device comprising one or more processors and one or more storage media, storing a set of instructions, which when executed by one or more processors cause performance of the method recited in claim 8.

13. A non-transitory computer readable storage medium, storing software instructions, which when executed by one or more processors cause the one or more processors to perform:

identifying, based on image content of one or more video images, a plurality of scenes in the one or more video images; wherein the plurality of scenes comprises at least one scene of high interest and at least one scene of low interest;

tracking a viewer's viewport of the one or more video images;

determining a plurality of regional cross sections of the one or more video images based on the plurality of scenes in the one or more video images and based on the viewer's viewport; wherein the plurality of regional cross sections comprises a first regional cross section corresponding to a scene of high interest within the viewer's viewport, a second regional cross section corresponding to a scene of high interest outside the viewer's viewport, and a third regional cross section corresponding to a scene of low interest outside the viewer's viewport;

applying a blurring filter with variable spatial resolutions to image data in a scene that encompasses a viewer's foveal vision, wherein no or little blurring is performed in a scene portion that encompasses the viewer's foveal vision, wherein stronger blurring is performed in the scene portion outside the viewer's foveal vision, and wherein the strength of the blurring is based at least in part on a spatial distance between a spatial location and the center of the viewer's foveal vision;

encoding a plurality of image portions of the one or more video images in the plurality of regional cross sections into two or more video sub-streams at two or more different spatiotemporal resolutions; wherein the two or more video sub-streams comprise a first video sub-stream with a first spatiotemporal resolution for the first regional cross section, a second video sub-stream with a second spatiotemporal resolution for the second regional cross section, and a third video sub-stream with a third spatiotemporal resolution for the third regional cross section; wherein the third spatiotemporal resolution is lower than the second spatiotemporal resolution; and wherein the second spatiotemporal resolution is lower than the first spatiotemporal resolution;

transmitting, to a streaming client device, an overall video stream that includes the two or more video sub-streams.

14. A non-transitory computer readable storage medium, storing software instructions, which when executed by one or more processors cause the one or more processors to perform:

receiving, from a streaming server, an overall video stream that includes two or more video sub-streams at two or more different spatiotemporal resolutions; wherein the two or more video sub-streams comprise a first video sub-stream with a first spatiotemporal resolution for a first regional cross section; a second video sub-stream with a second spatiotemporal resolution for a second regional cross section; and a third video sub-stream with a third spatiotemporal resolution for a third regional cross section; wherein the third spatiotemporal resolution is lower than the second spatiotemporal resolution; and wherein the second spatiotemporal resolution is lower than the first spatiotemporal resolution;

decoding the two or more video sub-streams into one or more image portions of one or more video images, wherein the one or more image portions are in one or more regional cross sections in a plurality of regional cross sections, wherein the plurality of regional cross sections is determined based at least in part on a plurality of scenes and based on a viewer's viewport, wherein the plurality of scenes is detected based on image content of the one or more video images; wherein the plurality of regional cross sections comprises the first regional cross section corresponding to a scene of high interest within the viewer's viewport, the second regional cross section corresponding to a scene of high interest outside the viewer's viewport, and the third regional cross section corresponding to a scene of low interest outside the viewer's viewport, and wherein a blurring filter with variable spatial resolutions is applied to image data in a scene that encompasses a viewer's foveal vision, wherein no or little blurring is performed in a scene portion that encompasses the viewer's foveal vision, wherein stronger blurring is performed in the scene portion outside the viewer's foveal vision, and wherein the strength of the blurring is based at least in part on a spatial distance between a spatial location and the center of the viewer's foveal vision;

generating, based on the one or more image portions of the one or more video images, video content;
causing the video content to be rendered in a display.

\* \* \* \* \*